(12) United States Patent
Schricker et al.

(10) Patent No.: US 6,675,639 B1
(45) Date of Patent: Jan. 13, 2004

(54) APPARATUS AND METHOD TO DETECT CYLINDER FAULTS OF INTERNAL COMBUSTION ENGINES VIA EXHAUST TEMPERATURE MONITORING

(75) Inventors: David R. Schricker, Dunlap, IL (US); Masoud K. Zavarehi, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 150 days.

(21) Appl. No.: 09/696,599

(22) Filed: Oct. 25, 2000

(51) Int. Cl.[7] .............................................. G01M 19/00
(52) U.S. Cl. ...................................................... 73/118.1
(58) Field of Search ................................ 73/118.1, 116, 73/117.3; 123/676, 435; 701/102, 112, 114, 115

(56) References Cited

U.S. PATENT DOCUMENTS

| | | | |
|---|---|---|---|
| 5,361,628 A | * | 11/1994 | Marko et al. .................. 73/116 |
| 5,492,006 A | | 2/1996 | Beckett |
| 5,553,593 A | | 9/1996 | Schnaibel et al. |
| 5,566,091 A | * | 10/1996 | Schricker et al. ...... 364/551.01 |
| 5,821,412 A | | 10/1998 | Bryan et al. |
| 6,092,016 A | * | 7/2000 | Sarangapani et al. ...... 73/117.3 |

* cited by examiner

Primary Examiner—Edward Lefkowitz
Assistant Examiner—Maurice Stevens
(74) Attorney, Agent, or Firm—Haverstock Garrett & Roberts

(57) ABSTRACT

An apparatus and method for detecting cylinder faults collects temperature data representative of temperatures of exhaust from the cylinder, estimates true temperatures of the exhaust as a function of the collected temperature data and at least one compensation factor, and determines deviations of the estimated true temperatures from at least one reference value. At least one severity symptom value is determined as a function of the deviations, and compared with at least one predetermined reference value for a known cylinder condition.

19 Claims, 7 Drawing Sheets

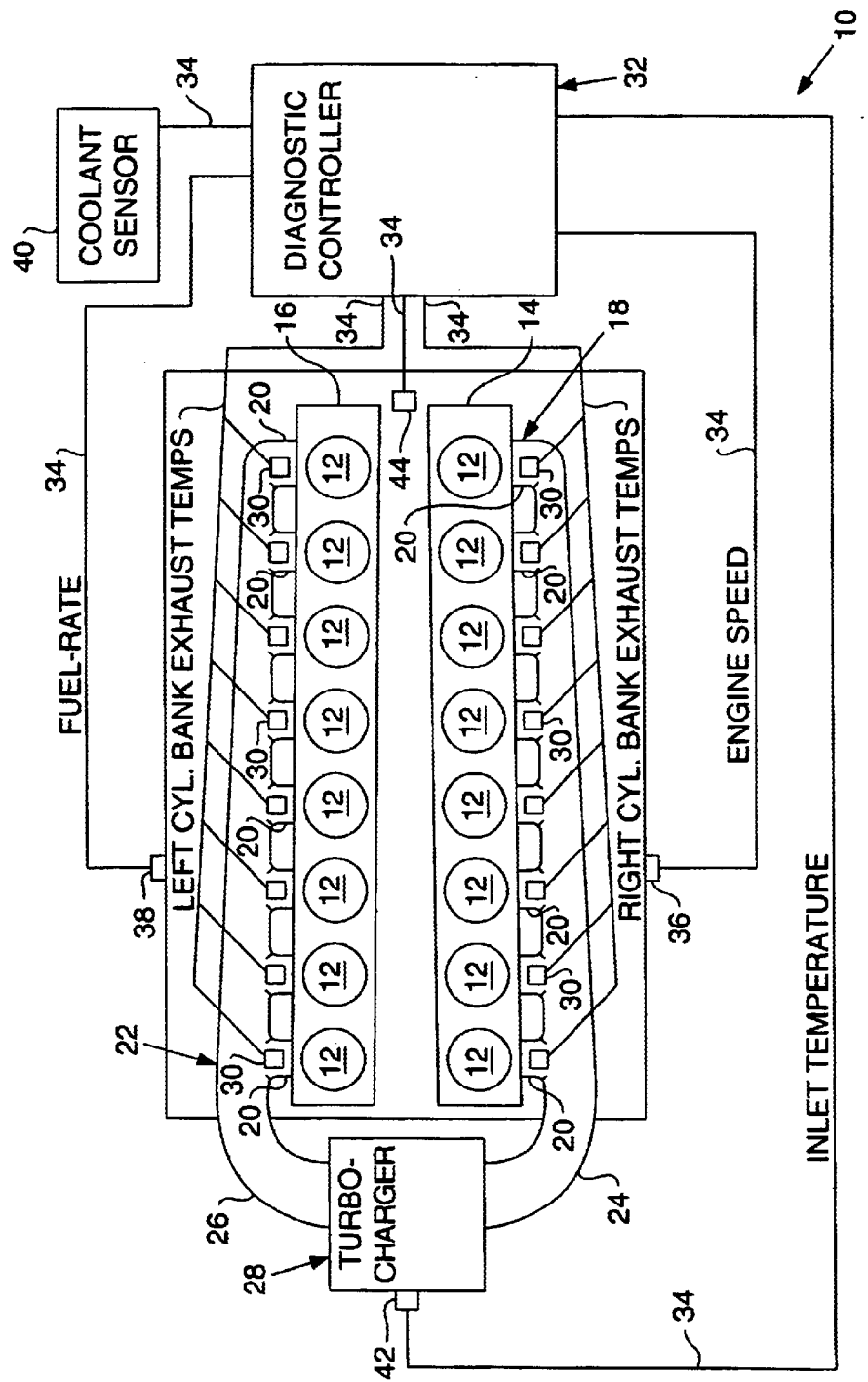

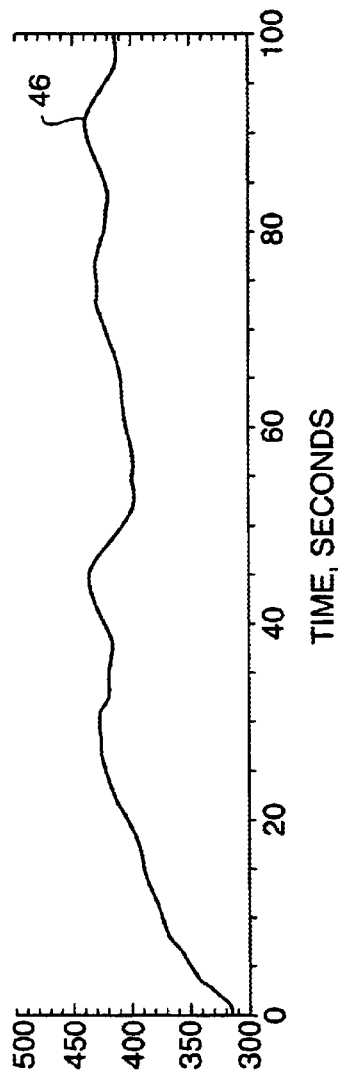
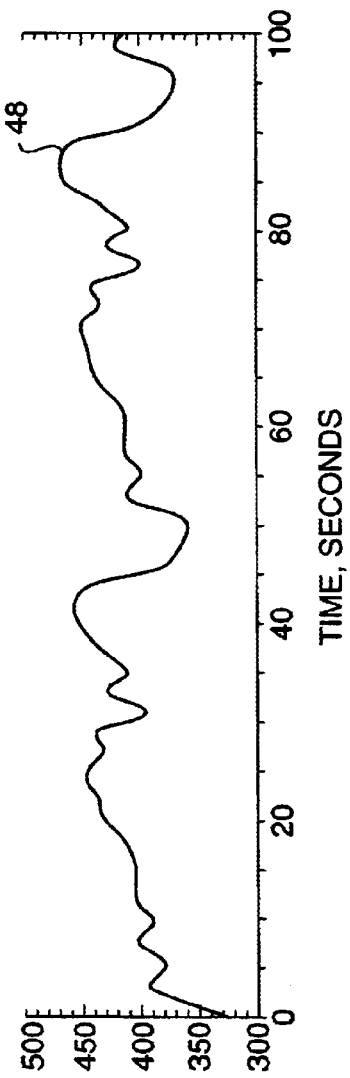

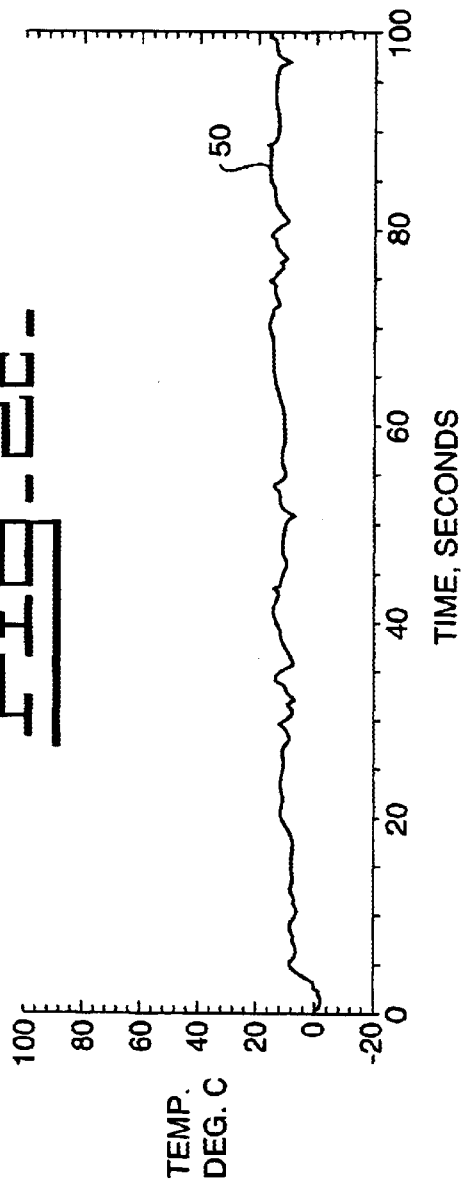
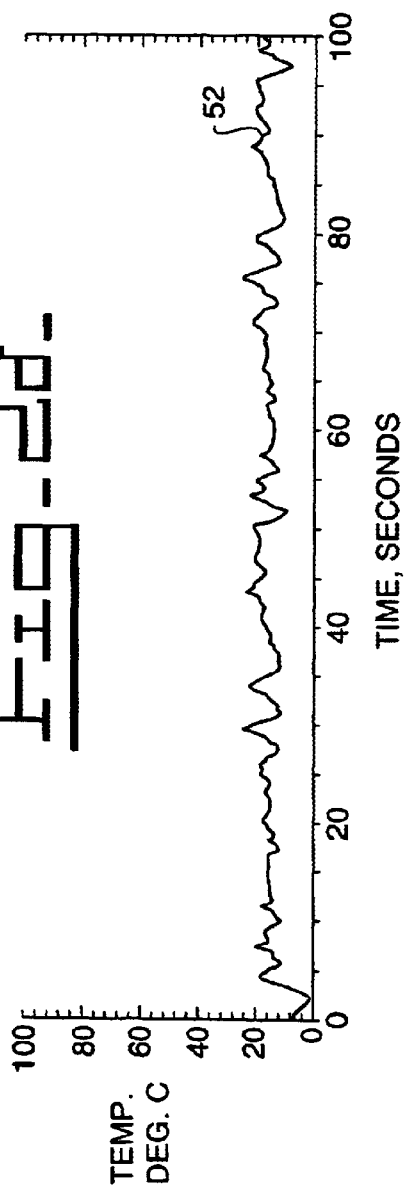

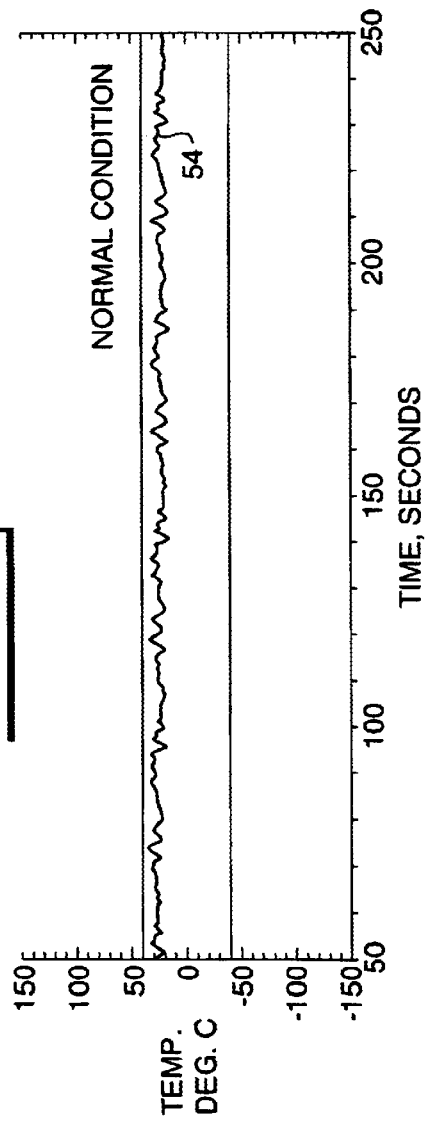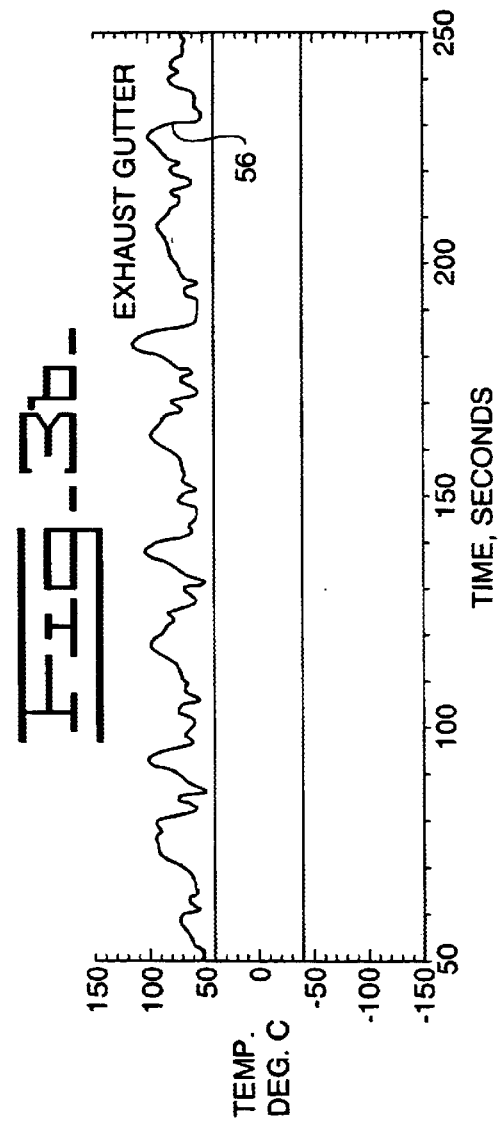

APPARATUS AND METHOD TO DETECT CYLINDER FAULTS OF INTERNAL COMBUSTION ENGINES VIA EXHAUST TEMPERATURE MONITORING

TECHNICAL FIELD

This invention relates generally to a reciprocating internal combustion engine, and more particularly, to apparatus and a method for detecting and determining the severity of faults in individual cylinders of the engine using temperature data representative of true exhaust temperatures from the respective cylinders.

BACKGROUND ART

It is well known that the diagnosis or detection of faults in cylinders of internal combustion engines can be a tedious time-consuming process resulting in extended downtime, reduced productivity and increased operational costs. Undiagnosed or undetected cylinder faults can also shorten the lifespan of an engine and necessitate expensive repairs. Reference in this regard, R. K. Autar, Automated Diagnostic Expert System For Diesel Engines, Heavy Duty Engines, A Look At The Future, American Society of Mechanical Engineers, Internal Combustion Division (publication) I.C.E. 2294, which discloses an automated diagnostic system based on artificial intelligence criterion using mechanical signature analyses of signals acquired from engine mounted sensors. The system uses vibration signals together with oil pressure and temperature, crankcase pressures, exhaust gas temperature and pressure, exhaust emissions, manifold noise levels, inlet manifold pressure, fuel delivery pressure, and instantaneous engine speed. Reference also Paul J. O'Sullivan, Advance Engine Diagnostics Using Universal Process Modeling, Maintenance Technologies SAE. Special Publications volume 1188 1986, SAE, Warrendale, Pa. U.S.A., which discloses an engine diagnostic tool for avoiding component failure using a universal process modeling technique wherein early warning signals are detected by monitoring a number of system parameters, such as exhaust temperature, engine vibration and inlet manifold pressure, and generating computer models to simulate the operation of the engine using a library of past information as reference data. However, a shortcoming of systems and tools such as these is the need for sensor data collection from a relatively large number of sensors.

Referenced further, Schricker U.S. Pat. No. 5,566,091 issued Oct. 15, 1996 to Caterpillar, Inc. which discloses a method and apparatus for machine health inference by comparing two like loaded components, wherein operating parameters of the components are sensed, differences therebetween are determined, averaged, and then trended for determining relative performance of the components. Determining machine health using trend data according to this method is effective for constant speed or near steady load applications. However, such method is less advantageous when a machine operates under dynamic work cycle conditions during which exhaust gas temperature can vary by hundreds of degrees over a relatively short time period. In particular, under dynamic conditions, using the known trending methods it is difficult to determine small temperature deviations, of, for instance, about 20° or so, which have been found to be an indication or a clue to the existence of cylinder faults such as intake or exhaust valve problems such as guttering, a weak or leaking fuel injector, and the like. Here, "guttering" is generally defined as a channeling of the face of the valve as a result of corrosion or the like, and is a problem as it can give rise to gas leakage past the valve and potential breakage of the valve head. It is also difficult to determine the severity of various cylinder faults and problems using the known systems and methods.

Accordingly, the present invention is directed to overcoming one or more of the problems as set forth above.

DISCLOSURE OF THE INVENTION

In one aspect of the present invention, a method for detecting and determining severity of a fault in a cylinder of an internal combustion engine useful under both steady-state and dynamic operating conditions is disclosed. The method includes the steps of:

(a) collecting temperature data representative of temperatures of exhaust from the cylinder;

(b) estimating true temperatures of the exhaust as a function of the collected temperature data;

(c) determining deviations of the estimated true temperatures from at least one reference value; and (d) determining at least one severity symptom value for the cylinder as a function of the deviations determined, and comparing the at least one severity symptom value with at least one predetermined reference value for a known cylinder condition.

In another aspect of the present invention apparatus including elements for detecting and determining severity of a fault in a cylinder of an internal combustion engine under both steady-state and dynamic operating conditions is disclosed. The apparatus includes an element for estimating true temperatures of exhaust from the cylinder as a function of collected temperature data and at least one compensation factor, an element for determining deviations of the estimated true temperatures from at least one reference value, and an element for determining at least one severity symptom value as a function of the deviations determined, and comparing the at least one severity symptom value with at least one predetermined reference value for a known cylinder condition.

BRIEF DESCRIPTION OF THE DRAWINGS

FIG. 1 is a schematic representation of an engine including apparatus according to the present invention for practice of the present method;

FIG. 2a is a graphical representation of sensed temperature data used according to the present invention;

FIG. 2b is a graphical representation of true temperature data estimated according to the present invention;

FIG. 2c is a graphical representation of temperature difference data determined according to the present invention;

FIG. 2d is a graphical representation of temperature deviation data determined according to the present invention;

FIG. 3a is a graphical representation of temperature deviation data for a normal cylinder used according to the present invention;

FIG. 3b is a graphical representation of temperature deviation data for one known condition used according to the present invention;

BEST MODE FOR CARRYING OUT THE INVENTION

Figure 3C:
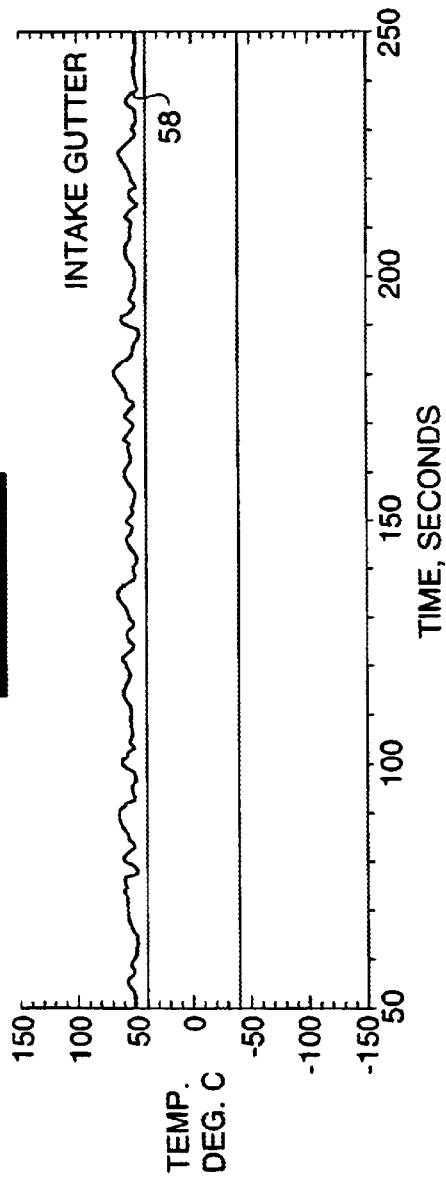
FIG. 3c is a graphical representation of temperature deviation data for another known condition used according to the present invention.

With reference to FIG. 1, the present invention is directed to apparatus and a method to detect and determine the severity of cylinder faults of internal combustion engines, represented by the typical prior art engine 10 shown. Engine 10 is a conventionally constructed and operable reciprocating internal combustion engine having sixteen cylinders 12, each including a piston reciprocally operable therein for combusting a mixture of air and fuel in the conventional manner. The cylinders 12 are contained in first and second cylinder banks, identified as a right cylinder bank 14 and a left cylinder bank 16. A right exhaust manifold 18 is connected to right cylinder bank 14 and includes a plurality of individual exhaust runners 20 communicating respectively with cylinders 12 of right cylinder bank 14 for receiving exhaust products exhausted therefrom. Similarly, a left exhaust manifold 22 is connected to left cylinder bank 16 and includes a plurality of individual exhaust runners 20 connected respectively to cylinders 12 of left cylinder bank 16 for receiving exhaust products exhausted therefrom. The exhaust runners 20 of right exhaust manifold 18 are connected to a right exhaust conduit 24 and the runners 20 of left exhaust manifold 22 connect to a left exhaust conduit 26, exhaust conduits 24 and 26 terminating at a conventionally constructed and operable turbo-charger 28 for delivering the exhaust from cylinders 12 thereto.

Engine 10 includes a plurality of sensors for sensing various parameters thereof, including a plurality of exhaust temperature sensors 30 which comprise elements of the apparatus of the present invention and are located, respectively, in or in communication with each exhaust runner 20 of the respective exhaust manifolds 18 and 22 for sensing temperatures representative of the temperatures in exhaust ports (not shown) extending from the respective cylinders 12 to the associated respective runners 20 in the well known, conventional manner. The exhaust temperature sensors 30 are each connected to a processor based diagnostic controller 32, which is also an element of the apparatus of the present invention, by a conductive path 34 for sending temperature data representative of the temperatures in the exhaust ports of the cylinders 12 thereto. Sensors 30 shown are representative of a wide variety of conventional temperature sensor devices including a thermocouple operable for determining temperature changes in the usual manner, for instance, a commercially available one-quarter inch stainless steel sheathed, ungrounded K-type thermocouple, and generating an output signal representative of the temperature changes. Controller 32 or conductive path 34 can additionally optionally include a signal processor adapted and operable for converting the temperature signals generated by sensors 30 from an analog to a digital format for use by a processor or processors of controller 32 in the well known conventional manner.

Other sensors of engine 10 for sensing various parameters thereof can include, but are not limited to, an engine speed sensor 36, a fuel-rate sensor 38, a coolant temperature sensor 40, a turbine inlet temperature sensor 42, and a turbine boost pressure sensor 44, sensor 42 being associated with turbo-charger 28 and sensor 44 being associated with an intake manifold of the engine. Sensors 36, 38, 40, 42 and 44 are connected to controller 32 by conductive paths 34 in the conventional manner.

Here, it should be understood that it is contemplated that the apparatus and method according to the present invention can be utilized with a wide variety of different engine constructions and configurations, including engines having a lesser or a greater number of cylinders and/or cylinder banks than engine 10 shown and also engines having a lesser or a greater number of sensors than engine 10 shown. Additionally, it should be understood that engines with which the present apparatus and method can be used for detecting cylinder fault conditions therein can include engines which operate under generally constant speed or near steady load conditions, for instance, engines used for powering electric power generation units, and also, and importantly, engines for powering machines under dynamic work cycle or operating conditions, which machines can include, for instance, wheel loaders, track loaders, and the like. A particular problem found when diagnosing cylinder fault conditions in engines operated under dynamic work cycle conditions, such as the engines of wheel loaders and the like, is that during the dynamic work cycles, the actual or true exhaust gas temperatures can vary by 100° C. or more within a matter of seconds or tens of seconds, thereby making accurately trending temperature data and extracting indications or clues of fault conditions difficult and unreliable.

Referring to FIG. 2a, to illustrate the operation of the apparatus according to the present invention and preferred initial steps of the present method for overcoming this problem, a trace 46 is shown which is a typical trace of exhaust port temperatures sensed by an exhaust temperature sensor, such as a sensor 30, from a selected exhaust port of a cylinder 12 of an engine such as the engine 10. The temperature data is in degrees C. and extends over a time period of 100 seconds which represents two typical dynamic work cycles of a machine, such as a wheel loader or the like. Examining trace 46, it is noted that although the amplitude of the trace varies, the trace is relatively smooth, and further is repetitive for the two work cycles. However, the smoothness of trace 46 has been found to be due at least in significant part to slowness or delay by the sensor in responding to rapid temperature changes within the exhaust port, such that trace 46 does not accurately represent contemporaneous or near contemporaneous temperatures in the port. Such delays are a common shortcoming when using sensors, such as the K-type thermocouples just referenced, due at least in part to the sheathing used to encase the sensors, and it has been found that such delays are predictable. This enables such delays to be compensated for or corrected, such that a more accurate indication or estimation of true or real temperature changes within the exhaust port can be made. To illustrate, reference is made to a trace 48 in FIG. 2b which is a trace of the estimated true temperatures in the exhaust port from which the data of trace 46 was collected, after correction or compensation by controller 32 using at least one compensation factor for the delay of the sensor used, and using the current slow probe measurement and measured rate of temperature change, i.e., $$T_c = T_m + \tau(dT_m/d\tau)$$

where $T_c$ is the estimated true temperature, $T_m$ is the measured temperature, and $\tau$ is time. Comparing traces 46 and 48, it can be seen that the trace 48 of the estimated true temperature changes more abruptly, that is, it is less smooth than trace 46 such that trace 48 represents a more accurate depiction of temperature changes within the exhaust port of the subject cylinder during the subject work cycles.

After determining the estimated true temperatures for the exhaust from a cylinder, then by conditioning and processing the temperature data, it has been found that the symptoms indicative of the health condition for several severity levels (i.e., normal, mild, and severe) and performance of the individual cylinders of an engine can be derived and compared with symptoms or information representative of the health condition and performance of a healthy cylinder and/or of one or more known cylinder fault conditions, to enable diagnosing or detecting a problem or fault condition in a cylinder for the severity levels (i.e., normal, mild fault, and severe fault). This, and/or the preceding step can be done by controller 32 or another suitable processor associated with engine 10 or at another location.

temperature deviation characteristics, or symptoms, relative to those of the normal, healthy cylinder, so as to provide evidence or clues to the existence of those faults and the level or degree of severity thereof.

In this regard, reference is made to Table 1 which shows a set of expert rules for representative fault symptoms for a variety of the problems in terms of mean (MEAN) and variance (VAR) of port temperature deviation from the average for the cylinder bank (representing a healthy cylinder), and periodicity (PRD) of port temperature, that is, the cyclic or repetitive nature of the deviations.

TABLE 1

| Faulty Element | Injector | | Intake Valve | Exhaust Valve | | Thermocouple Sensor | | |
| --- | --- | --- | --- | --- | --- | --- | --- | --- |
| | 25% | 15% | | | | | | |
| Fault Mode | Dead | Weak | Weak | 2 Gutters | 3 Gutters | 1 Gutter | Open | Short | Noisy |
| Fault Symptoms | | | | | | | | | |
| MEAN | Very Low | Low | Slightly Low | High | High | Slightly High | Very High | 0 | N/A |
| VAR | Low | Normal | Normal | Normal | High | Slightly High | N/A | N/A | High |
| PRD | N/A | N/A | N/A | High | High | Slightly High | N/A | N/A | N/A |

As will be shown, the present apparatus and method have been found to be useful for detecting and diagnosing moderate to severe valve and fuel injector problems, including, but not limited to, exhaust valve guttering, intake valve guttering, a weak or leaking fuel injector, and temperature sensor problems such as an electrical short, an open circuit, and a noisy signal.

A second step of operation of the present apparatus and method includes determining a reference value for a cylinder being diagnosed. Here, the preferred reference value is the average value or the median value of all port temperatures in a bank of cylinders including the subject cylinder. As an alternative, the normal or healthy cylinder temperature can be used, determined for instance using such parameters as engine speed, fuel position, and the like. Next, the controller or other processor determines deviations of the estimated true temperatures from this reference value. Referring to FIG. 2c, trace 50 represents these deviations over the subject work cycles. As an option, to ensure sensitivity to small changes in port temperature, normal temperature differences due to speed, load and other operating condition changes can also be eliminated from the temperature data by comparing the deviations of the estimated temperatures from the reference value to a reference value or values for the same or corresponding operating conditions, for instance, the current speed and load conditions.

Deviations of the estimated true temperatures from temperatures for a healthy or normal cylinder model over the work cycles shown in FIGS. 2a and 2b after elimination of normal temperature differences due to speed and load changes or variations are represented by trace 52 in FIG. 2d. In the same manner, temperature deviations for a cylinder having any of the valve and injector problems identified above can be determined, under the same, or under a variety of other or additional operating conditions, importantly, it having been found that the cylinder faults discussed above, namely, exhaust valve guttering, intake valve guttering, a weak or leaking fuel injector, and sensor problems, and various levels and degrees of these faults, have distinct Here, it should be understood that the expert rules contained in Table 1 are intended to be exemplary of the many expert rules that can be used, and that other or additional aspects or parameters of the engine can also be monitored and/or used for developing expert rules or for controlling or refining the model, including, but not limited to, pressure and temperature data collected from a turbocharger, such as turbocharger 28 using sensors 42 and 44, coolant temperature information, such as can be collected using coolant sensor 40, and fuel-rate information, which can be collected, for instance, using sensor 38.

Examining the expert rules of Table 1, it can be seen that an injector problem can be diagnosed in three levels of severity using fault symptoms determinable according to the present invention. For example, when the mean value of the deviation of the estimated true temperatures from the average cylinder bank temperature is very low and the variance of the deviations from the average is low, a dead injector is indicated. When the mean is low and the variance is normal, a 25 percent weak injector is indicated. When the mean is slightly low and the variance is normal, a 15 percent weak injector is indicated. As another example, when the mean is high but the variance is normal, intake valve guttering is indicated. Periodicity is also high. In comparison, when exhaust valve guttering is indicated, the mean and the variance will be high (three gutters) or both will be slightly high (one gutter). The periodicity will also be high or slightly high.

Figure 3D:
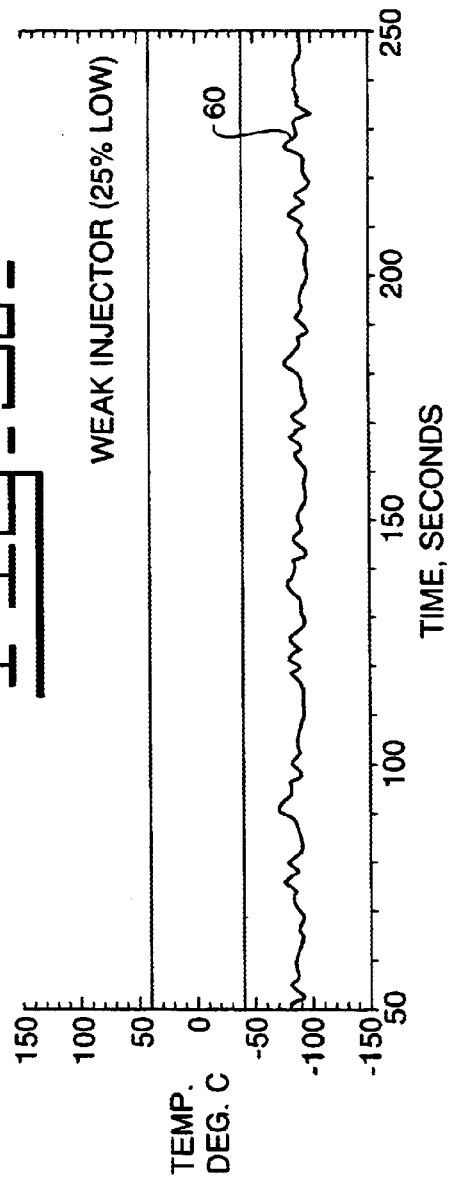
FIG. 3d is a graphical representation of temperature deviation data for still another known condition used according to the present invention.

Turning to FIG. 3a, a baseline trace 54 of temperature deviations for a normal, healthy model cylinder is shown, the deviations being within a range between about zero and about 40° C. above zero. For comparison, in FIG. 3b, a trace 56 representative of deviations of estimated true temperatures from the model for an exhaust valve guttering condition is shown, the temperature deviations ranging widely generally between about 40° C. and about 100° C. (indicating high variance and mean as predicted by the expert rules). In FIG. 3c, a trace 58 shows temperature deviations for an intake valve guttering fault, the temperature deviations varying normally but being higher than about 40° C. (thus having the high mean as predicted by the rule in Table 1). FIG. 3d shows a trace 60 representative of temperature deviations for a weak injector fault (with about 25% fuel leakage), wherein the deviation values typically vary between about 60 and about 100° C. below a nominal value (low mean and normal variance).

Thus, it is evident that by comparing symptoms, including, but not limited to, the mean and variance of the deviations of the estimated true temperature data for a subject cylinder from the average cylinder bank temperatures, and in some instances, the periodicity of the deviations, the existence of several cylinder faults and at least one level of severity of each, can be determined. Here, it should be understood that expert rules in addition to those shown in Table 1, and additional tolerances, and/or ranges can be utilized in this comparison, as required or desired, and where the determined values for a subject cylinder fall between those for two of the faults or severities of a fault. Further, it is preferred that at least three levels of health or severity of a fault be detectable using the present apparatus and method, e.g., normal, moderate fault (i.e., 15 percent weak injector, 1 gutter) and severe fault (i.e., dead injector, multiple gutters), although a greater or lesser number of severity levels could also be determinable as required or desired.

Based on the foregoing examples, it is evident that by determining reliable estimated true temperature values for the exhaust flowing from a cylinder during a particular work cycle or operating period of interest, then reducing the data, for instance, by determining deviations of the estimated true temperatures from a reference value, such as, but not limited to, a median or average temperature value for a bank of cylinders containing the subject cylinder, at least one severity symptom value can be determined as a function of the determined deviations, and the at least one severity symptom value compared to at least one predetermined reference value, to accurately detect or diagnose a cylinder fault condition, and, if applicable, the degree of severity thereof.

Figure 4:
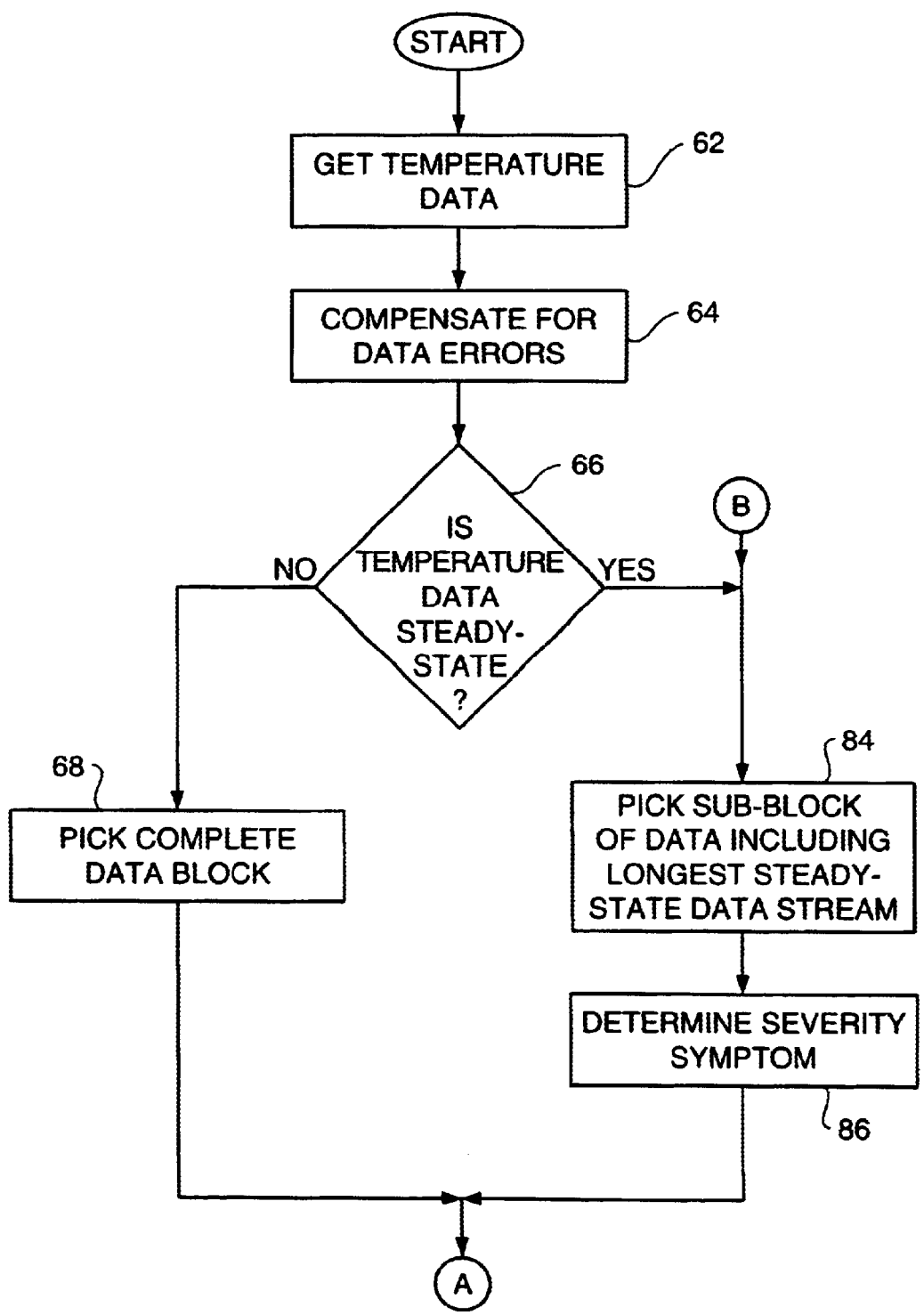
FIG. 4 is a high level flowchart illustrating the method according to the invention.
Figure 5:
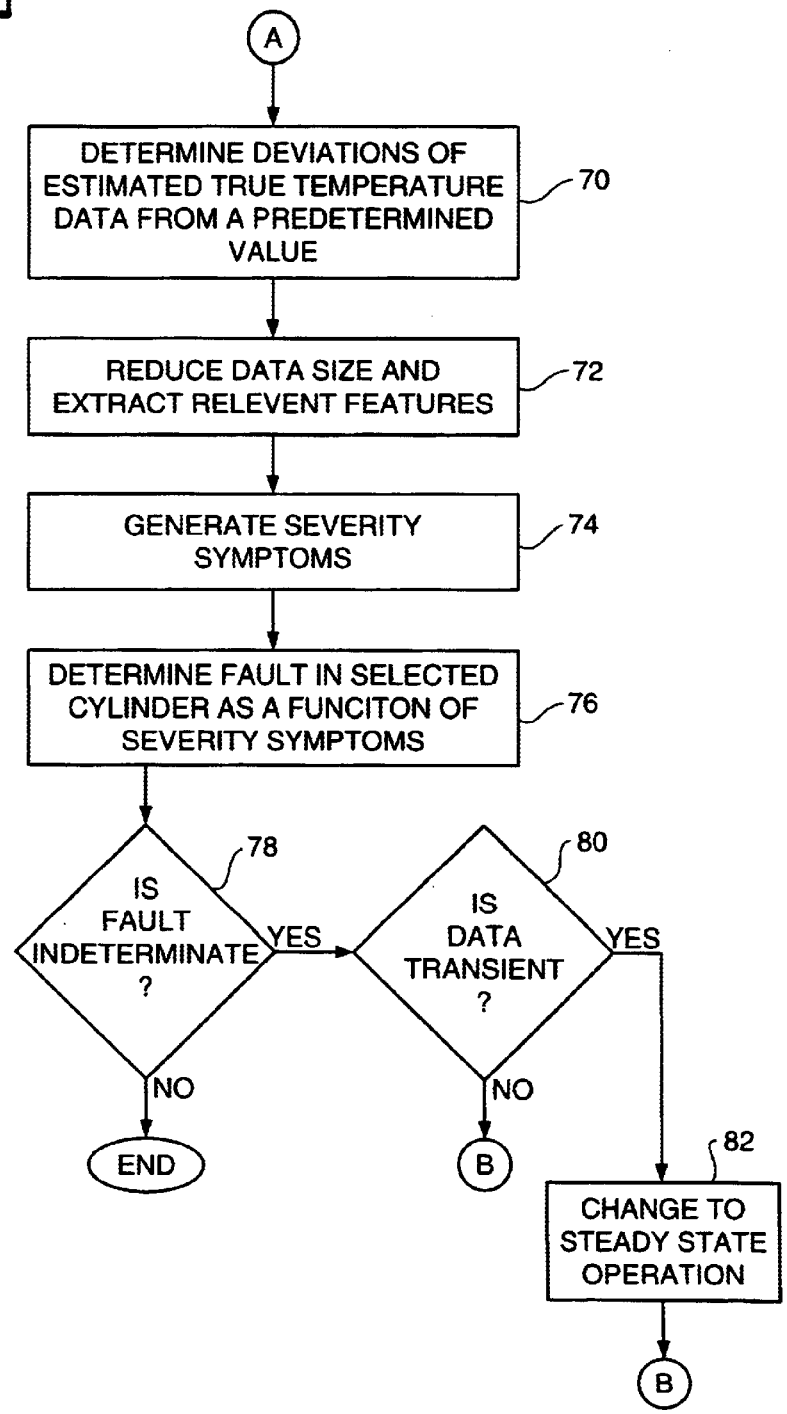
FIG. 5 is a continuation of the flowchart of FIG. 4.

Turning to FIGS. 4 and 5, a flow diagram including preferred steps according to the present method is shown. At a first block 62, the exhaust temperature data for the exhaust port of a selected cylinder is collected from a sensor, such as an exhaust temperature sensor 30. At a block 64, errors in the collected temperature data, such as, but not limited to, delay errors due to slowness of the sensor in response to temperature changes, are compensated for using known factors such as those shown in the equation above to obtain estimated true temperatures for the exhaust from the subject cylinder. At a decision block 66, it is determined whether the temperature data is steady state, using the determined median or reference temperature and a suitable test such as a sequential probability ratio test (SPRT), or the rate of change of the reference temperature in a statistical sense. If the temperature data is not steady state, a large or sufficiently complete data block is selected which encompasses at least one dynamic work cycle, as shown by a block 68. Then, continuing from point A in FIG. 5, at a block 70, deviations of the estimated true temperatures from a reference value, preferably a healthy engine model, represented by an average or median temperature value for the bank of cylinders including the subject cylinder, are determined.

At a block 72 and a block 74, the temperature data size can be reduced as desired and relevant features extracted to determine or generate severity symptoms for the cylinder condition. These symptoms can include for instance, but are not limited to, mean, variance, average, and/or standard deviation values for the temperature deviations. Then, as shown at a block 76, the severity of the fault can be determined in the selected cylinder as a function of the severity symptoms by comparing the determined symptoms with predetermined values such as known symptom values for a normal cylinder and known symptom values for at least one fault condition, and preferably for at least two fault levels, i.e., moderate and severe, using the expert rules for the system.

At a decision block 78, if the fault and/or its severity is successfully determined using the above steps, then its existence can be stored in memory and/or a signal outputted in any convenient desired manner to alert the engine operator, maintenance personnel, or the like. If the fault is indeterminate, for instance it appears that there is a fault, but it cannot be accurately distinguished in type or severity, in some instances of transient or nonsteady-state engine operation, it has been found that the fault and/or its severity may be more accurately determined from symptoms determined during steady-state operation of the engine 10, particularly, periodicity of the temperature data under certain speed and/or load conditions. Referring to the expert rules contained in Table 1 to illustrate, valve problems can be distinguished from injector and sensor problems by a high periodicity, and a one exhaust valve gutter problem can be distinguished from a three exhaust valve gutter problem by the degree of periodicity. Thus, if the fault is indeterminate, then at an optional decision block 80 it is determined whether the temperature data is transient. If yes, then a command can optionally be outputted to the engine operator, or the engine 10 can otherwise be caused to be operated for some suitable period of time under steady-state conditions, as shown at a block 82. Returning to decision block 66 and point B in FIG. 4, if the temperature data was already steady-state, or the engine operation is now changed to steady-state, then a sub-block of the estimated true temperature data during the steady-state operation is picked, as shown at a block 84. At a block 86 at least one severity symptom is determined, for instance, by analysis of the estimated true port temperatures using fast Fourier transforms (FFT), polyspectral density (PSD) analysis or the like. The severity symptom determined can be, but is not limited to, the amplitude of the temperature spectrum at a narrow frequency or the periodicity of the temperature data. Then, picking up again at point A in FIG. 5, at blocks 70, 72, 74, and 76, the steps are the same as discussed above, deviations of the temperature data from the predetermined value are determined, the relevant features are extracted to determine or generate the previously discussed severity symptoms (i.e., mean, variance, average, and/or standard deviation values) for the cylinder condition, and the fault, and, where applicable, the level of severity thereof, is diagnosed.

INDUSTRIAL APPLICABILITY

The present apparatus and method for detecting cylinder faults of internal combustion engines have utility for a wide variety of applications, including steady state operating applications wherein exhaust temperature is relatively constant, and also more dynamic operating conditions wherein during a work cycle exhaust temperature may vary by a 100° or more within the matter of just a few seconds, for instance, such as is typical for the engines of work machines such as loaders, tractors, and other construction and agricultural machines, as well as forestry and mining machines. Additionally, the present invention has utility for use with a wide variety of different engine sizes and configurations in addition to the one employed in the example above, for example, a conventional six cylinder in-line engine or the like. The present apparatus and method also have utility for applications employing a wide variety of sensing or temperature data collecting elements, in addition to or as an alternative to the K-type thermocouples employed in the example above, and the elements for determining the fault conditions can comprise any of a wide variety of processors, such as, but not limited to, a remote processor which receives the temperature data via a hard wired or wireless data link.

Other aspects, objects and advantages of the present invention can be obtained from a study of the drawings, the disclosure and the appended claims.

What is claimed is:

1. A method for detecting a fault in a cylinder of an internal combustion engine, comprising the steps of:
    (a) collecting temperature data representative of temperatures of exhaust from the cylinder;
    (b) estimating true temperatures of the exhaust as a function of the collected temperature data and at least one compensation factor;
    (c) determining deviations of the estimated true temperatures from at least one reference value; and
    (d) determining at least one severity symptom value for the cylinder as a function of the deviations determined, and comparing the at least one severity symptom value with at least one predetermined reference value for a known cylinder condition.

2. The method of claim 1, where in step (d) the at least one severity symptom value comprises a mean or a variance of the deviations determined in step (c).

3. The method of claim 1, where in step (b) the true temperatures are estimated at least in part by compensating for slowness in the collected temperature data.

4. The method of claim 1, including an additional step prior to determining the at least one severity symptom value, of determining whether the temperature data is representative of a steady-state operating condition.

5. The method of claim 1, where in step (d) the at least one predetermined reference value comprises at least one corresponding symptom value for a known cylinder fault.

6. The method of claim 5 wherein the at least one known cylinder fault comprises at least one level of an exhaust valve fault.

7. The method of claim 5, wherein the known cylinder fault comprises at least one level of an intake valve fault.

8. The method of claim 5, wherein the known cylinder fault comprises at least one level of an injector fault.

9. The method of claim 1, wherein the reference value of step (c) is a median temperature value for the exhaust.

10. The method of claim 1, where in step (d) the determining of the at least one severity symptom value includes computing at least mean and variance values for the deviations determined in step (c).

11. The method of claim 10, wherein if the temperature data is steady state then the step of determining the at least one severity symptom value comprises determining a spectral amplitude of the temperature data.

12. The method of claim 1, comprising the further step of after comparing the at least one severity symptom value for the cylinder with the at least one predetermined reference value for a known cylinder condition, and the fault is indeterminate and the temperature data is not steady-state, then operating the engine under steady-state conditions and determining an additional severity symptom.

13. Apparatus for detecting a fault in a cylinder of an internal combustion engine, comprising:
    an element for collecting temperature data representative of temperatures of exhaust from the cylinder;
    an element for estimating true temperatures of the exhaust as a function of the collected temperature data and at least one compensation factor;
    an element for determining deviations of the estimated true temperatures from at least one reference value; and
    an element for determining at least one severity symptom value for the cylinder as a function of the deviations determined, and comparing the at least one severity symptom value with at least one predetermined reference value for a known cylinder condition.

14. Apparatus of claim 13, wherein the element for determining at least one severity symptom value determines a mean and a variance of the deviations determined.

15. Apparatus of claim 14 wherein the known cylinder condition comprises at least one level of an exhaust valve fault.

16. Apparatus of claim 14, wherein the known cylinder condition comprises at least one level of an intake valve fault.

17. Apparatus of claim 14, wherein the known cylinder condition comprises at least one level of an injector fault.

18. Apparatus of claim 13, wherein the at least one severity symptom value comprises a periodicity value for the deviations determined.

19. Apparatus of claim 13, wherein if the temperature data is steady-state then the at least one severity symptom value comprises a spectral amplitude of the temperature data.

* * * * *